United States Patent
Li et al.

(10) Patent No.: US 12,511,874 B2
(45) Date of Patent: Dec. 30, 2025

(54) SMART NAVIGATION METHOD AND SYSTEM BASED ON TOPOLOGICAL MAP

(71) Applicant: BEIJING JINGDONG 360 DEGREE E-COMMERCE CO., LTD., Beijing (CN)

(72) Inventors: Yanli Li, Beijing (CN); Xiaofeng Sun, Beijing (CN); Guiwang He, Beijing (CN); Jinhua Cai, Beijing (CN)

(73) Assignee: BEIJING JINGDONG 360 DEGREE E-COMMERCE CO., LTD., Beijing (CN)

( * ) Notice: Subject to any disclaimer, the term of this patent is extended or adjusted under 35 U.S.C. 154(b) by 1374 days.

(21) Appl. No.: 17/264,223

(22) PCT Filed: Aug. 9, 2019

(86) PCT No.: PCT/CN2019/099972
§ 371 (c)(1),
(2) Date: Jan. 28, 2021

(87) PCT Pub. No.: WO2020/034903
PCT Pub. Date: Feb. 20, 2020

(65) Prior Publication Data
US 2021/0302585 A1 Sep. 30, 2021

(30) Foreign Application Priority Data
Aug. 17, 2018 (CN) .......................... 201810942528.9

(51) Int. Cl.
G01C 3/08 (2006.01)
G01S 17/89 (2020.01)
(Continued)

(52) U.S. Cl.
CPC ............ *G06V 10/764* (2022.01); *G01S 17/89* (2013.01); *G06F 18/217* (2023.01); *G06T 7/521* (2017.01);
(Continued)

(58) Field of Classification Search
CPC ...... G06V 10/764; G06V 10/82; G06V 20/56; G01S 17/89; G01S 17/06; G06F 18/217;
(Continued)

(56) References Cited

FOREIGN PATENT DOCUMENTS

| CN | 104834308 A | 8/2015 |
|---|---|---|
| CN | 104898660 A | 9/2015 |

(Continued)

OTHER PUBLICATIONS

Japanese Patent Office Notice of Reasons for Refusal for Application No. 2021-502925 dated Jan. 11, 2022 (8 pages, including English translation).

(Continued)

*Primary Examiner* — Samantha K Nickerson
(74) *Attorney, Agent, or Firm* — Michael Best & Friedrich LLP

(57) ABSTRACT

The invention discloses a smart navigation method and system based on a topological map, and relates to the technical field of computers. The smart navigation method based on a topological map comprises: determining a travelable region view according to current location information based on a constructed topological map (S101); acquiring scene data, the scene data at least including a scene image, a scene depth map, and a scene analysis map (S102); and determining an action decision based on the travelable region view, the scene data, and a navigation model (S103). The travelable region view is determined based on a multi-index navigation model and the constructed topological map; and relative to a map-free mode, the accuracy of (Continued)

real-time navigation can be improved under constraint of GPS, but GPS is not entirely relied on, so robustness of navigation can be improved.

13 Claims, 6 Drawing Sheets

(51) Int. Cl.
    *G06F 18/21* (2023.01)
    *G06T 7/521* (2017.01)
    *G06T 7/579* (2017.01)
    *G06V 10/764* (2022.01)
    *G06V 10/82* (2022.01)
    *G06V 20/56* (2022.01)

(52) U.S. Cl.
    CPC .............. *G06T 7/579* (2017.01); *G06V 10/82* (2022.01); *G06V 20/56* (2022.01); *G06T 2207/10028* (2013.01); *G06T 2207/20081* (2013.01); *G06T 2207/20084* (2013.01); *G06T 2207/30252* (2013.01)

(58) Field of Classification Search
    CPC ................. G06T 7/521; G06T 7/579; G06T 2207/10028; G06T 2207/20081; G06T 2207/20084; G06T 2207/30252
    See application file for complete search history.

(56) References Cited

FOREIGN PATENT DOCUMENTS

| | | | | |
|---|---|---|---|---|
| CN | 107179082 A | * | 9/2017 | ........... G01C 21/165 |
| CN | 107226087 A | | 10/2017 | |
| CN | 108196535 A | | 6/2018 | |
| CN | 108268033 A | | 7/2018 | |
| IN | 104570771 A | | 4/2015 | |
| JP | 2018024286 A | | 2/2018 | |
| JP | 2018067234 A | | 4/2018 | |
| JP | 2018112989 A | | 7/2018 | |

OTHER PUBLICATIONS

Japanese Patent Office Decision to Grant a Patent for Application No. 2021-502925 dated Aug. 9, 2023 (5 pages, including English Translation).
Japanese Patent Office Action for Application No. 2021-502925 dated Aug. 17, 2022 (6 pages, including an English translation).
Japanese Patent Office Notice of Reasons for Refusal for Related Application No. 2021502925 dated Feb. 6, 2023 (4 pages, including an English translation).
The State Intellectual Property Office of the People's Republic of China Second Office Action for Application No. 201810942528.9 dated Jul. 12, 2021 (12 pages including English translation).
Chinese Patent Office action for Application No. 201810942528.9 dated Dec. 23, 2020 (8 pages including statement of relevance).
Translation of International Search Report for Application No. PCT/CN2019/099972 dated Oct. 29, 2019 (3 pages).

* cited by examiner

SMART NAVIGATION METHOD AND SYSTEM BASED ON TOPOLOGICAL MAP

CROSS-REFERENCE TO RELATED APPLICATION(S)

This is a U.S. national stage entry of International Patent Application No. PCT/CN2019/099972, filed on Aug. 9, 2019, which claims priority to Chinese Patent Application No. 201810942528.9, filed on Aug. 17, 2018, the entire contents of each of which are fully incorporated herein by reference.

TECHNICAL FIELD

The disclosure relates to the technical field of computers, and in particular to a smart navigation method and system based on a topological map.

BACKGROUND ART

Most of the existing autonomous driving techniques rely on high-definition maps for smart navigation, but the process of acquiring the high-definition maps is time-consuming and labor-intensive, and constant maintenance and update are required. In the prior art, for map-free smart navigation by street scenes, DeepMind researchers have proposed a method based on deep reinforcement learning.

In the aforementioned map-free smart navigation method, its action includes only 5 decisions (rotating by −67.5 degrees, −22.5 degrees, 22.5 degrees, and 67.5 degrees, and going forward). The action decision is too simple and has difficulty to cope with real driving. Further, the method completely relies on images for smart navigation, and because the images are affected by light, it is hard to conduct autonomous navigation in week light such as night scenes. In addition, the reward of the method is defined by a function from a target location. Generally speaking, a good navigation engine should be restricted by many aspects, including a travel time, a travel distance, and a violation. Thus, a real navigation model under multiple indices can hardly be trained by this method. Finally, the method requires no map, which will greatly expand the number of samples in a state space, so an optimization process cannot easily converge, and training is time-consuming and labor-intensive.

SUMMARY OF THE INVENTION

In view of this, an embodiment of the disclosure provides a smart navigation method and system based on a topological map, which can determine a travelable region view based on a multi-index navigation model and a constructed topological map, and relative to a map-free mode, the invention can improve the accuracy of real-time navigation under constraint of GPS, but the invention does not entirely rely on GPS, and thus can improve robustness of navigation.

In order to achieve the aforementioned object, according to one aspect of the embodiment of the disclosure, a smart navigation method based on a topological map is provided.

A smart navigation method based on a topological map according to the embodiment of the disclosure, comprises: determining a travelable region view according to current location information based on a constructed topological map; acquiring scene data, the scene data at least including a scene image, a scene depth map, and a scene analysis map; and determining an action decision based on the travelable region view, the scene data, and a navigation model.

Optionally, the step of determining a travelable region view according to current location information based on a constructed topological map comprises: performing a width expansion with traveling track points as the center in the topological map according to a preset width expansion rule to obtain a travelable region; determining a range image in the topological map according to the current location information; and marking the travelable region in the range image to obtain the travelable region view.

Optionally, the step of acquiring scene data comprises: collecting the scene image by a vehicle-mounted camera in real time; analyzing a scene depth of the scene image to obtain the scene depth map; and performing a semantic analysis on the scene image to obtain the scene analysis map.

Optionally, the scene data further includes laser point cloud data; and the step of acquiring scene data further comprises: collecting liar points by a vehicle-mounted lidar in real time; and normalizing the lidar points to obtain the laser point cloud data.

Optionally, the navigation model is obtained by training based on deep reinforcement learning; and the step of determining an action decision based on the travelable region view, the scene data, and a navigation model comprises: performing a feature extraction on the sample data by an image classification convolutional network; importing the extracted feature, a target location, and a previous moment reward into a first layer of recurrent neural network; importing an output of the first layer of recurrent neural network and a previous moment action into a second layer of recurrent neural network; and predicting the action decision by a fully connected network based on an output of the second layer of recurrent neural network.

Optionally, the action decision at least includes: a travel speed, a deflection angular speed, a travel direction and a deflection direction; and the step of predicting the action decision by a fully connected network comprises: predicting the travel speed, the deflection angular speed, the travel direction and the deflection direction of the action decision respectively to obtain corresponding predicted probabilities; and determining a combination of actions with the highest predicted probabilities as the predicted action decision.

In order to achieve the aforesaid object, according to another aspect of the embodiment of the disclosure, a smart navigation system based on a topological map is provided.

A smart navigation system based on a topological map according to the embodiment of the disclosure, comprises: a travelable region view determining module for determining a travelable region view according to current location information based on a constructed topological map; a scene data acquiring module for acquiring scene data, the scene data at least including a scene image, a scene depth map, and a scene analysis map; and a decision determining module for determining an action decision based on the travelable region view, the scene data, and a navigation model.

Optionally, the travelable region view determining module is further used for performing a width expansion with traveling track points as the center in the topological map according to a preset width expansion rule to obtain a travelable region; determining a range image in the topological map according to the current location information; and marking the travelable region in the range image to obtain the travelable region view.

Optionally, the scene data acquiring module is further used for collecting the scene image by a vehicle-mounted camera in real time; analyzing a scene depth of the scene image to obtain the scene depth map; and performing a semantic analysis on the scene image to obtain the scene analysis map.

Optionally, the scene data acquiring module is further used for collecting liar points by a vehicle-mounted lidar in real time; and normalizing the lidar points to obtain laser point cloud data; and the scene data further includes the laser point cloud data.

Optionally, the decision determining module is further used for performing a feature extraction on the sample data by an image classification convolutional network; importing the extracted feature, a target location, and a previous moment reward into a first layer of recurrent neural network; importing an output of the first layer of recurrent neural network and a previous moment action into a second layer of recurrent neural network; and predicting the action decision by a fully connected network based on an output of the second layer of recurrent neural network; and the navigation model is obtained by training based on deep reinforcement learning.

Optionally, the decision determining module is further used for predicting a travel speed, a deflection angular speed, a travel direction and a deflection direction of the action decision respectively to obtain corresponding predicted probabilities; and determining a combination of actions with the highest predicted probabilities as the predicted action decision; and the action decision at least includes: the travel speed, the deflection angular speed, the travel direction and the deflection direction.

In order to achieve the aforesaid object, according to a further aspect of the embodiment of the disclosure, an electronic device is provided.

An electronic device according to the embodiment of the disclosure, comprises: one or more processors; and a storage means for storing one or more programs, wherein the one or more programs, when executed by the one or more processors, cause the one or more processors to implement the smart navigation method based on a topological map according to any preceding claim.

In order to achieve the aforesaid object, according to a further aspect of the embodiment of the disclosure, a computer-readable medium, having a computer program stored thereon, characterized in that the program, when executed by a processor, implements the smart navigation method based on a topological map according to any preceding claim, is provided.

The aforesaid one embodiment in the invention has the following advantages or beneficial effects: before a vehicle travels, route planning is completed according to a topological map and a travelable route can be acquired. In the traveling process of the vehicle, based on the topological map and the determined travelable route, the vehicle can be roughly located and the travelable region can be acquired according to a GPS signal (the topological map is established by a series of GPS location points), and then local precise navigation is performed by a deep neural network. As compared with a map-free mode, the embodiment of the disclosure can improve the accuracy of real-time navigation under constraint of GPS, and thanks to multiple indices of a navigation model, the embodiment of the disclosure does not entirely rely on GPS, and thus can improve robustness of navigation.

Further effects of the aforesaid non-conventional optional manners will be described below in combination with specific implementation modes.

BRIEF DESCRIPTION OF THE DRAWINGS

Figures are used to better understand the disclosure, and do not form improper limitations of the disclosure. Where.

DETAILED DESCRIPTION

The exemplary embodiments of the disclosure, including various details of the embodiment of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

Figure 1:
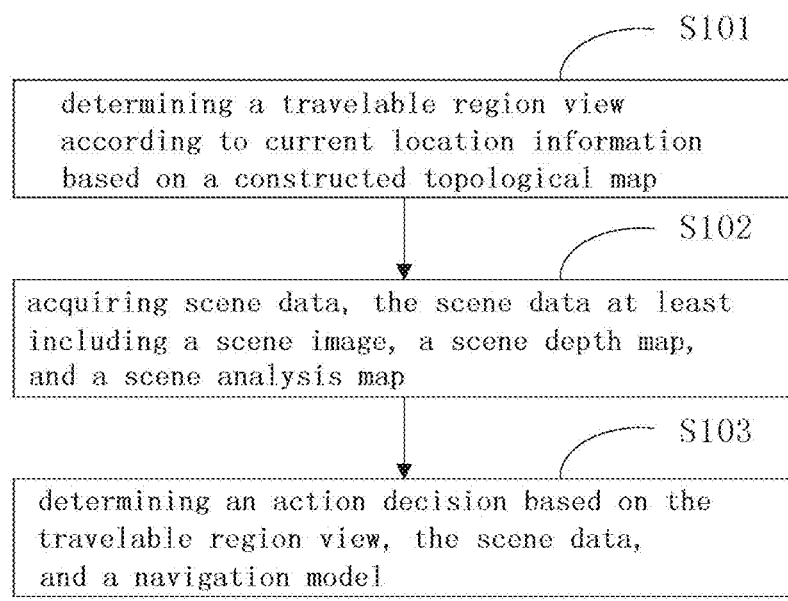
FIG. 1 is a schematic diagram of a main flow of a smart navigation method based on a topological map of according to an embodiment of the disclosure.
Figure 2:
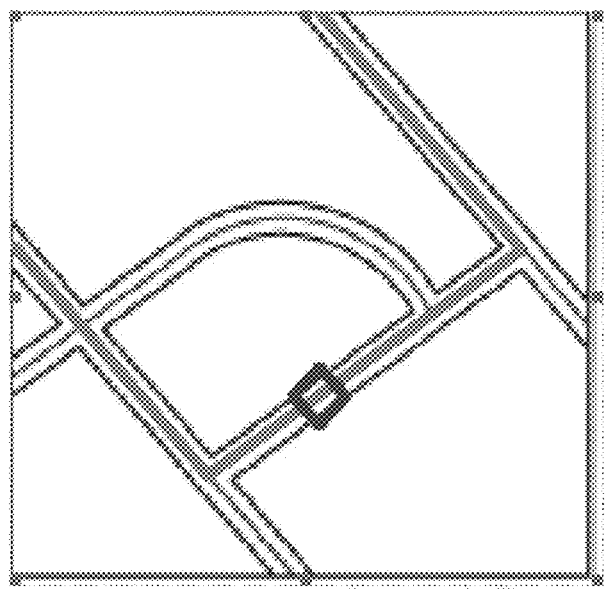
FIG. 2 is a schematic diagram of a travelable region of a smart navigation method based on a topological map according to an embodiment of the disclosure.

FIG. 1 is a schematic diagram of a main flow of a smart navigation method based on a topological map of according to an embodiment of the disclosure, and FIG. 2 is a schematic diagram of a travelable region of a smart navigation method based on a topological map according to an embodiment of the disclosure;

As shown in FIG. 1, the smart navigation method based on a topological map according to the embodiment of the disclosure mainly comprises:

Step S101: determining a travelable region view according to current location information based on a constructed topological map. The topological map is composed of nodes and edges, where the node is a GPS location, and the edge is constructed by two GPS locations. The topological map is a travelable route map established by a series of key GPS location points, which is acquired in an inexpensive manner and avoids a cost for establishing a high-definition map. To be specific, a width expansion is performed with traveling track points as the center in the topological map according to a preset width expansion rule to obtain a travelable region; a range image is determined in the topological map according to the current location information; and the travelable region in the range image is marked to obtain the travelable region view.

The width expansion is performed with the traveling track points as the center in the topological map, for example, an expansion into a travelable region of 2 meters on the left and right is performed, as shown in FIG. 2. Cutting along a traveling tangent direction is performed at the current GPS location, for example, cutting into a 500*500 image of 50 m*50 m with a zoom ratio of 1 pixel/0.1 m is performed, and the travelable region is marked as 255 and other regions are marked as 0 so as to obtain the travelable region view. The traveling track is a vehicle traveling route established by a series of GPS locations; and the traveling tangent is a tangent at each traveling location, and can be defined as one formed by connecting two adjacent traveling points.

Step S102: acquiring scene data, the scene data at least including a scene image, a scene depth map, and a scene analysis map. To be specific, the scene image is collected by a vehicle-mounted camera in real time; a scene depth of the scene image is analyzed to obtain the scene depth map; and a semantic analysis is performed on the scene image to obtain the scene analysis map.

Figure 3:
FIG. 3 is a schematic diagram of a collected scene image of a smart navigation method based on a topological map according to an embodiment of the disclosure.
Figure 4:
FIG. 4 is a schematic diagram of a scene depth map of a smart navigation method based on a topological map according to an embodiment of the disclosure.
Figure 5:
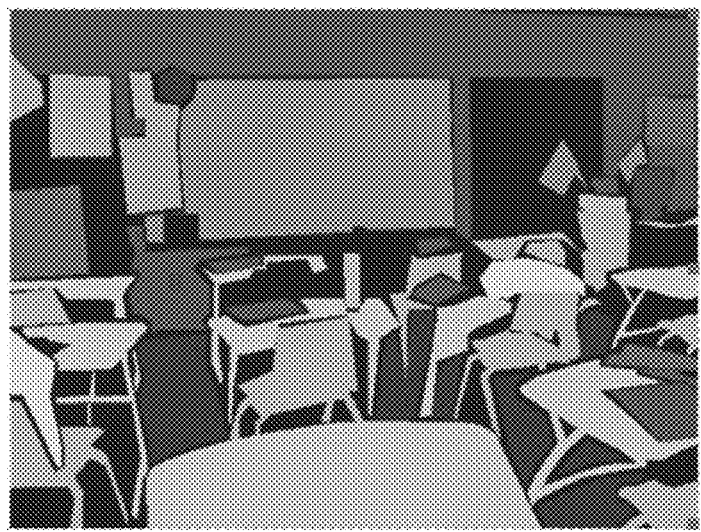
FIG. 5 is a schematic diagram of a scene analysis map of a smart navigation method based on a topological map according to an embodiment of the disclosure.
Figure 6:
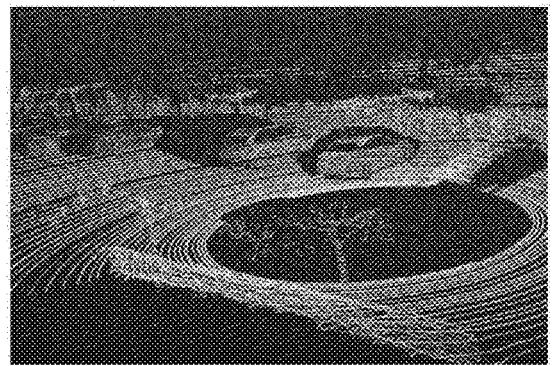
FIG. 6 is a schematic diagram of laser point cloud data of a smart navigation method based on a topological map according to an embodiment of the disclosure.

FIG. 3 is a schematic diagram of a collected scene image of a smart navigation method based on a topological map according to an embodiment of the disclosure; FIG. 4 is a schematic diagram of a scene depth map of a smart navigation method based on a topological map according to an embodiment of the disclosure; FIG. 5 is a schematic diagram of a scene analysis map of a smart navigation method based on a topological map according to an embodiment of the disclosure; and FIG. 6 is a schematic diagram of laser point cloud data of a smart navigation method based on a topological map according to an embodiment of the disclosure. In FIGS. 3-6 above, colors of pictures are not shown.

For the scene image, it also includes a video image, which is acquired by the vehicle-mounted camera collecting the environment in real time, as shown in FIG. 3, and includes R/G/B three channels (red, green, and blue channels). The color of the pixel in the channel layer is composed of a set of brightness values of the primary colors, and the channel can be actually understood as mapping of the selected region.

For the scene depth map, a depth analysis on a colored video image, as shown in FIG. 4, is just to mark a relative depth of each pixel, including a channel D (view difference), which can be acquired by pre-training by a scene depth analysis method. The scene depth is just a definition range in front of and behind the focus, the larger the scene depth is, the clearer the entire image from the distant scene to the close scene is; the smaller the scene depth is, the more blurred the foreground and the background will be with the clarity of the main body in focus, and the more presentable the main body is. Main factors affecting the scene depth are a focal distance, an aperture and a shooting distance. The longer the focal distance is, the larger the aperture is, and the shorter the shooting distance is, the smaller the scene depth is; and on the contrary, the shorter the focal distance is, the smaller the aperture is, and the longer the shooting distance is, the larger the scene depth is.

For the scene analysis map, a semantic analysis on a colored video image, as shown in FIG. 5, is just to mark that each pixel belongs to a tree, a road, a pedestrian, or a vehicle, etc., including a channel L (label Label), which can be acquired by pre-training by examples of a semantic scene analysis method.

The scene data further includes laser point cloud data, and liar points are collected by a vehicle-mounted lidar in real time for the laser point cloud data; and the lidar points are normalized to obtain the laser point cloud data. As shown in FIG. 6, the original lidar point includes three-channel coordinates X/Y/Z and an intensity I (reflection intensity Intensity) channel, a point cloud analysis method is further used to mark the category of each point, and finally an X/Y/Z/I/L five-channel point cloud is obtained. In the laser point cloud captured from the lidar, each point cloud point has a reflection intensity attribute, which represents the ability to absorb light of different media. The label Label is a discretized value. Since the units of the acquired X/Y/Z channel, I channel and L channel are not uniform, a normalization process is required. Thus, after an X/Y/Z/I/L five-channel point cloud is finally acquired, normalization is performed. The specific step is to subtract corresponding mean values from X/Y/Z/I/L respectively, and then make a division by a cutoff value after performing a cutoff, that is, $f(x)=\max(\min((x-T1),T2),-T2)/T2$, where the mean value T1 and the cutoff value T2 are empirical design values.

Step S103: determining an action decision based on the travelable region view, the scene data, and a navigation model. The navigation model is obtained by training based on deep reinforcement learning. To be specific, a feature extraction is performed on the sample data by an image classification convolutional network; the extracted feature, a target location, and a previous moment reward are imported into a first layer of recurrent neural network; an output of the first layer of recurrent neural network and a previous moment action are imported into a second layer of recurrent neural network; and the action decision is predicted by a fully connected network based on an output of the second layer of recurrent neural network. The target location GPS is input information, which just provides a destination.

The action decision at least includes: a travel speed, a deflection angular speed, a travel direction and a deflection direction. The travel speed, the deflection angular speed, the traveling direction and the deflection direction of the action decision are predicted respectively to obtain corresponding predicted probabilities; and a combination of actions with the highest predicted probabilities is determined as the predicted action decision. The deflection angular speed, which is a continuous value, is an rotation angle within a unit time; the travel direction, which is a discrete value, includes a vehicle going forward, stopping, or going backward; and the deflection direction, which is a discrete value, includes a vehicle turning left, making no turn, or turning right.

Figure 7:
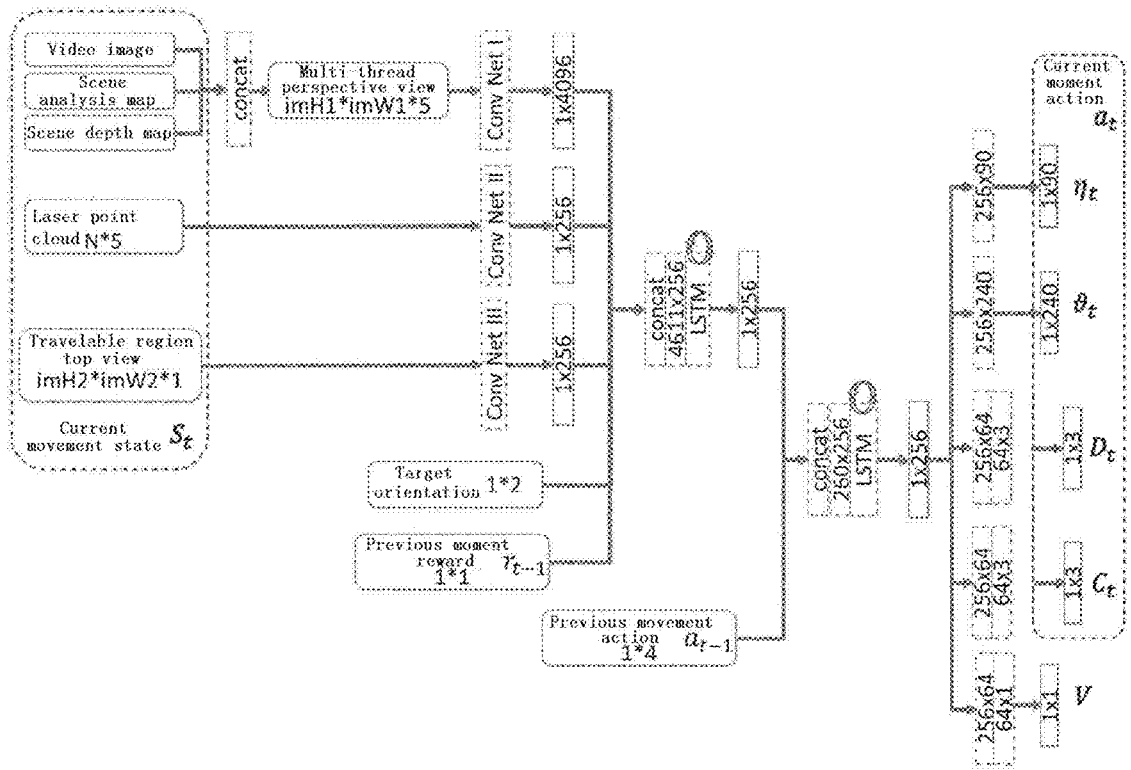
FIG. 7 is a schematic diagram of a structure of a deep neural network of a smart navigation method based on a topological map according to an embodiment of the disclosure.

The smart navigation performs action prediction in a deep neural network that uses an environmental state as an input, and iteratively updates network parameters by continuous exploration and acquisition of rewards. In the embodiment of the disclosure, an A3C (Asynchronous Advantage actor-critic) optimization strategy is used to optimize the parameters of the deep neural network, and the A3C optimization strategy iteratively updates network parameters of an action decision function (actor) and a value function (critic) according to accumulated rewards. FIG. 7 is a schematic diagram of a structure of a deep neural network of a smart navigation method based on a topological map according to an embodiment of the disclosure.

An input state is observation data provided from the external environment to guide the action decision of the smart navigation. In the embodiment of the invention, the input state includes a colored video image (ImW1*ImH1*3, where ImW1 and ImH1 are image sizes), a scene analysis map (ImW1*ImH1*1) and a scene depth map (ImW1*ImH1*1) of the colored video image, laser point cloud data (N*5, where N is the number of point clouds), and a travelable region view (ImW2*ImH2*1, where ImW2 and ImH2 are view sizes). The input state of a combination of multiple threads facilitates improvement of the robustness of the method.

The action decision controls the action of the vehicle, and motion parameters of a motor vehicle at each moment include the travel direction, the deflection direction, the travel speed, and the deflection angular speed. Similarly, in the embodiment of the disclosure, the action decision is defined as $a_t = \pi(s_t|\theta) = \{\eta_t, \vartheta_t, D_t, C_t\}$, where $\theta$ represents a parameter of a deep neural network model, $\eta_t$ is the travel speed (discretized into several parts, such as 240 parts, 1 km/h→240 km/h), $\vartheta_t$ is the deflection angular speed (discretized into several parts, for example, 90 parts, 1 degree/second→90 degrees/second), $D_t$ is the travel direction {−1: going backward, 0: stopping, 1: going forward}, and, is the deflection direction {−1: turning left, 0: making no turn, 1: turning right}. Correspondingly, the deep neural network model independently predicts each section of a deciding action, and calculates the probability of each part in each section to thereby select a combination of actions with the highest predicted probabilities.

As shown in FIG. 7, the deep reinforcement learning predicts the action decision based on the deep neural network, which includes a data layer and a network layer. The input includes a scene image, a scene analysis map, a scene depth map, laser point cloud data, a travelable region view, a target orientation and a previous moment reward, and the output is an action decision and a state value. The target orientation is a difference between the current GPS location and the target GPS. The embodiment of the disclosure only considers latitudes and longitudes, so 1*2-dimensional data is involved.

First, the scene image, the scene analysis map, and the scene depth map are cascaded into an image classification convolutional network (such as VGG16, ResNet101 or Inception V3) for a 5-channel image (R/G/B/L/D) to perform the feature extraction, and a 1*4096-dimensional feature is output. The laser point cloud data is a point set of 5-channel data (X/Y/Z/I/L), the point cloud classification convolutional network is used to extract the feature, and a 1*256 feature is output. The travelable region view is a 1-channel image, the image classification convolutional network (such as VGG16, ResNet101 or Inception V3) is also used to extract the feature, and a 1*256 feature is output. Second, the convolutional feature, the target orientation, and the previous moment reward are cascaded and imported into the first layer of recurrent neural network LSTM, the 1*256 feature output from the recurrent neural network and the previous moment action 1*4 are further cascaded and imported into the second layer of recurrent neural network LSTM, and a 256-dimensional feature is finally obtained. In order to independently predict each action decision and action value, a fully connected network is used to independently predict these 5 sections (travel speed, rotation angular speed, travel direction, rotation direction and action value).

In the embodiment of the disclosure, a rewarding rule is made in combination with multiple indices, including destination compliance, phased compliance, travelable region constraint, travel time, travel distance, traffic violation and stable driving determination. Details as given as follows:

1) Destination compliance: If a vehicle travels to the destination, a reward with, for example, 1,000 points, is given;
2) Phased compliance: A series of phased compliance locations are arranged at fixed distances on the traveling route, and a reward is given if the vehicle travels from the previous compliance location to the current compliance location. For example, a phased compliance location is arranged every 1 kilometer, and if the vehicle travels from the previous compliance location to this compliance location, a reward with 200 points is given;
3) Travelable region constraint: The width of the topological map is expanded by one travelable region, it is checked at intervals whether the vehicle deviates from the travelable region, and if the vehicle does not deviate, a reward is given, or otherwise a punishment is given. For example, a check is performed every 50 meters, and if the vehicle leaves the travelable region, a punishment with −1 point is given, or otherwise a reward with 1 point is given;
4) Travel time: An estimated travel time is set, the real travel time is measured when the vehicle arrives at the destination, and if the real travel time exceeds the estimated travel time, a punishment is given, or otherwise a reward is given. For example, the estimated travel time is 100 minutes, if the real travel time is 80 minutes, a reward with (100−80)=20 points is given, and if the real travel time is 120 minutes, a punishment with (100−120)=−20 points is given;
5) Travel distance: An estimated travel distance is set, the real travel distance is measured when the vehicle arrives at the destination, and if the real travel distance exceeds the estimated travel distance, a punishment is given, or otherwise a reward is given. For example, the estimated travel distance is 60 kilometers, if the real travel distance is 40 kilometers, a reward with (60−40)=20 points is given and if the real travel distance is 80 kilometers, a punishment with (60−80)=−20 points is given;
6) Reward and punishment for traffic violation:
a) Collision: If collisions with foreign objects occur, a punishment with, for example, −1,000 points, is given, where the foreign objects include, but are not limited to, pedestrians, vehicles, trees, curbs, and so on;
b) Traffic light reward and punishment: When the vehicle encounters a traffic light, a reward is given for the action of observing the traffic light, or otherwise a punishment is given. For example, a punishment with −500 points is given for running a red light, and a reward with 200 points is given for stopping at a red light;
c) Distance to the vehicle ahead: A minimum distance to the vehicle ahead is set, the real distance to the vehicle ahead is checked at intervals, and if the real distance is lower than the distance threshold, a punishment is given. For example, the minimum distance to the vehicle ahead is set to 10 meters, the distance to the vehicle ahead is checked every 1 minute, and when it is checked that the distance is less than 10 meters, a punishment with −5 points is given;
d) Punishment for speeding: The travel speed is checked at intervals according to the speed threshold of the current road section, and if the travel speed exceeds the speed threshold, a punishment is given. For example, it is checked that the speed threshold of the current road section is 60 km/h, the vehicle speed is checked every 1 minute, and when it is checked that the vehicle speed exceeds 60 km/h, a punishment with −5 points is given;

7) Reward and punishment for stable driving: Two acceleration and angular acceleration thresholds are set, the acceleration and angular acceleration of the vehicle are checked at intervals, and if the accelerations exceed the thresholds, a punishment is given. For example, the stable acceleration threshold is set to 5 m/s^2 and the angular acceleration threshold is set to 2 degrees/s^2, the vehicle acceleration and angular acceleration are checked every 10 minutes, and if it is checked that the accelerations exceed the thresholds, a punishment with −1 point is given, or otherwise a reward with 1 point is given.

At the same time, a weighted value can be set for the aforesaid rewards and punishments, and the final accumulated rewards and punishments are the weighted sum of these rewards and punishments. Thus, by setting different weighted values, navigation results biased toward a certain index can be trained. For example, by increasing the weighted value of the travel time, in the trained smart navigation method, the vehicle will arrive at the destination at a faster speed.

In the embodiment of the disclosure, a smart navigation method by street views under a topological map based on deep reinforcement learning is proposed. First, before a vehicle travels, route planning is completed according to a topological map and a travelable route can be acquired. In the traveling process of the vehicle, based on the topological map and the determined travelable route, the vehicle can be roughly located and the travelable region can be acquired according to a GPS signal, and then local precise navigation is performed by a deep neural network. As compared with a map-free mode, the embodiment of the disclosure can improve the accuracy of real-time navigation under constraint of GPS, and thanks to multiple indices of a navigation model, the embodiment of the disclosure does not entirely rely on GPS, and thus can improve robustness of navigation.

In the local precise navigation, the embodiment of the disclosure proposes a new deep neural network to control the vehicle decision, and improve functions from three aspects, that is, action, state, and reward. The action is the travel speed, the deflection angular speed, the travel direction and the deflection direction in a discrete space, which more realistically simulates the decision control of the vehicle. State data sources include the scene video image, the scene analysis map, the scene depth map, the laser point cloud data, and the travelable region view, and scene adaptability of a navigation engine can be improved by means of multiple data sources. Action rewards are defined under the constraint of multiple indices, including the travel time, the travel distance, the traffic violation, the phased compliance, and so on, and adaptive navigation under different indices is achieved by weighting rewards. In summary, the embodiment of the disclosure improves the robustness with less cost, and the proposed deep neural network and decision are also closer to real driving.

Figure 8:
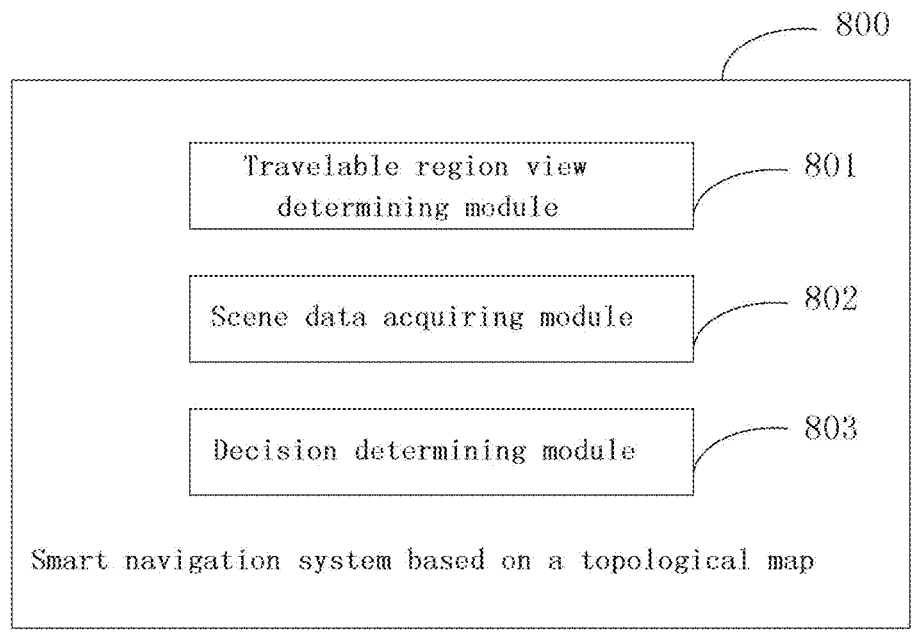
FIG. 8 is a schematic diagram of main modules of a smart navigation system based on a topological map according to an embodiment of the disclosure.

FIG. 8 is a schematic diagram of main modules of a smart navigation system based on a topological map according to an embodiment of the disclosure. As shown in FIG. 8, a smart navigation system based on a topological map 800 according to the embodiment of the disclosure comprises a travelable region view determining module 801, a scene data acquiring module 802 and a decision determining module 803.

The travelable region view determining module 801 is used for determining a travelable region view according to current location information based on a constructed topological map. The travelable region view determining module is further used for performing a width expansion with traveling track points as the center in the topological map according to a preset width expansion rule to obtain a travelable region; determining a range image in the topological map according to the current location information; and marking the travelable region in the range image to obtain the travelable region view.

The scene data acquiring module 802 is used for acquiring scene data, the scene data at least including a scene image, a scene depth map, and a scene analysis map. The scene data acquiring module is further used for collecting the scene image by a vehicle-mounted camera in real time; analyzing a scene depth of the scene image to obtain the scene depth map; and performing a semantic analysis on the scene image to obtain the scene analysis map. The scene data acquiring module is further used for collecting liar points by a vehicle-mounted lidar in real time; and normalizing the lidar points to obtain laser point cloud data. The scene data further includes the laser point cloud data.

The decision determining module 803 is used for determining an action decision based on the travelable region view, the scene data, and a navigation model. The decision determining module is further used for performing a feature extraction on the sample data by an image classification convolutional network; importing the extracted feature, a target location, and a previous moment reward into a first layer of recurrent neural network; importing an output of the first layer of recurrent neural network and a previous moment action into a second layer of recurrent neural network; and predicting the action decision by a fully connected network based on an output of the second layer of recurrent neural network. The navigation model is obtained by training based on deep reinforcement learning.

The decision determining module is further used for predicting a travel speed, a deflection angular speed, a travel direction and a deflection direction of the action decision respectively to obtain corresponding predicted probabilities; and determining a combination of actions with the highest predicted probabilities as the predicted action decision. The action decision at least includes: the travel speed, the deflection angular speed, the travel direction and the deflection direction.

The deep reinforcement learning predicts the action decision based on the deep neural network, which includes a data layer and a network layer. The input includes a scene image, a scene analysis map, a scene depth map, laser point cloud data, a travelable region view, a target orientation and a previous moment reward, and the output is an action decision and a state value. In the embodiment of the disclosure, the scene image, the scene analysis map, and the scene depth map are cascaded into an image classification convolutional network for a 5-channel image (R/G/B/L/D) to perform the feature extraction, and a 1*4096-dimensional feature is output. The laser point cloud data is a point set of 5-channel data (X/Y/Z/I/L), the point cloud classification convolutional network is used to extract the feature, and a 1*256 feature is output.

The travelable region view is a 1-channel image, the image classification convolutional network is also used to extract the feature, and a 1*256 feature is output. Second, the convolutional feature, the target orientation, and the previous moment reward are cascaded and imported into the first layer of recurrent neural network LSTM, the 1*256 feature output from the recurrent neural network and the previous moment action 1*4 are further cascaded and imported into the second layer of recurrent neural network LSTM, and a 256-dimensional feature is finally obtained. In order to independently predict each action decision and action value, a fully connected network is used to independently predict these 5 sections (travel speed, rotation angular speed, travel direction, rotation direction and action value). Moreover, a rewarding rule is made in combination with multiple indices, including destination compliance, phased compliance, travelable region constraint, travel time, travel distance, traffic violation and stable driving determination.

In the embodiment of the disclosure, a smart navigation method by street views under a topological map based on deep reinforcement learning is proposed. First, before a vehicle travels, route planning is completed according to a topological map and a travelable route can be acquired. In the traveling process of the vehicle, based on the topological map and the determined travelable route, the vehicle can be roughly located and the travelable region can be acquired according to a GPS signal, and then local precise navigation is performed by a deep neural network. As compared with a map-free mode, the embodiment of the disclosure can improve the accuracy of real-time navigation under constraint of GPS, and thanks to multiple indices of a navigation model, the embodiment of the disclosure does not entirely rely on GPS, and thus can improve robustness of navigation.

In the local precise navigation, the embodiment of the disclosure proposes a new deep neural network to control the vehicle decision, and improve functions from three aspects, that is, action, state, and reward. The action is the travel speed, the deflection angular speed, the travel direction and the deflection direction in a discrete space, which more realistically simulates the decision control of the vehicle. State data sources include the scene video image, the scene analysis map, the scene depth map, the laser point cloud data, and the travelable region view, and scene adaptability of a navigation engine can be improved by means of multiple data sources. Action rewards are defined under the constraint of multiple indices, including the travel time, the travel distance, the traffic violation, the phased compliance, and so on, and adaptive navigation under different indices is achieved by weighting rewards. In summary, the embodiment of the disclosure improves the robustness with less cost, and the proposed deep neural network and decision are also closer to real driving.

Figure 9:
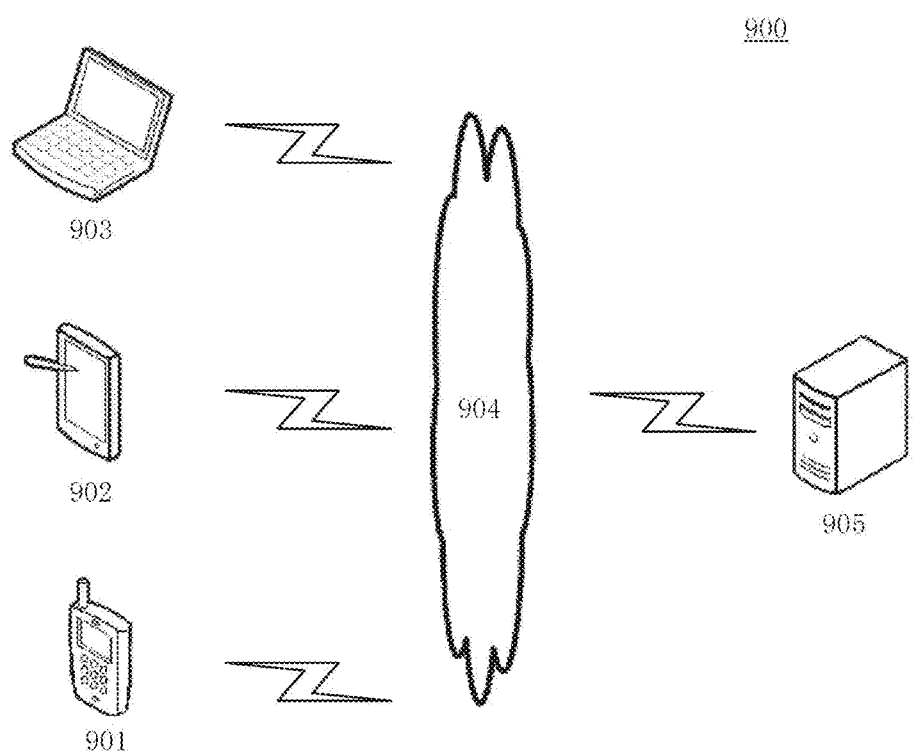
FIG. 9 is an exemplary system architecture diagram to which an embodiment of the disclosure can be applied.

FIG. 9 is an exemplary system architecture 900 to which a smart navigation method based on a topological map or a smart navigation system based on a topological map according to an embodiment of the disclosure can be applied.

As shown in FIG. 9, the system architecture 900 may comprise terminal devices 901, 902, 903, a network 904, and a server 905. The network 904 is a medium for providing a communication link between the terminal devices 901, 902, 903 and the server 905. The network 904 may include various connection types, such as wired or wireless communication links, or fiber-optic cables.

The user may use the terminal devices 901, 902, 903 to interact with the server 905 through the network 904 to receive or send messages and so on. Various communication client applications, such as shopping applications, web browser applications, search applications, instant messaging tools, email clients, social platform software and so on (only examples), may be installed on the terminal devices 901, 902, 903.

The terminal devices 901, 902, 903 may be various electronic devices having display screens and supporting web browsing, including but not limited to smart phones, tablet computers, laptop portable computers, desktop computers and so on.

The server 905 may be a server that provides various services, such as a background management server that provides support for shopping websites browsed by the user using the terminal devices 901, 902, 903 (only an example). The background management server may process, for example, analyze the received request for querying product information and other data, and feed the processing results back to the terminal devices.

It shall be noted that the smart navigation method based on a topological map provided by the embodiment of the disclosure is generally executed by the server 905, and correspondingly, the smart navigation system based on a topological map is generally provided in the server 905.

It shall be understood that the numbers of the terminal devices, the networks, and the servers in FIG. 9 are merely schematic. According to implementation requirements, there may be any numbers of the terminal devices, the networks, and the servers.

Figure 10:
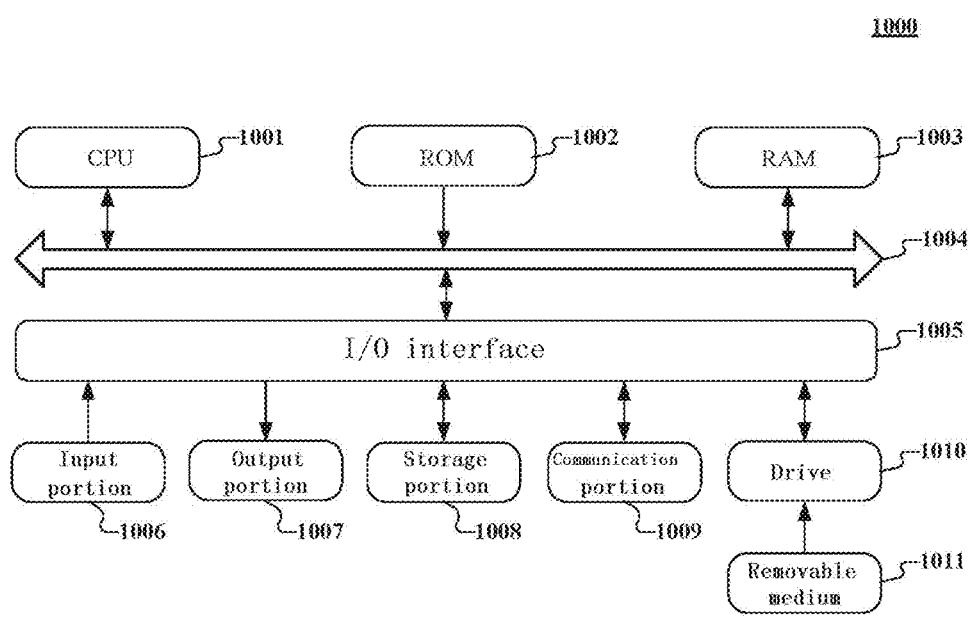
FIG. 10 is a schematic diagram of a structure of a computer system suitable for implementing a terminal device or a server according to an embodiment of the disclosure.

Reference is now made to FIG. 10, which shows a schematic diagram of a structure of a computer system 1000 suitable for implementing a terminal device according to an embodiment of the disclosure. The terminal device shown in FIG. 10 is only an example, and shall not impose any limitation on the functions and the scope of use of the embodiment of the disclosure.

As shown in FIG. 10, the computer system 1000 includes a central processing unit (CPU) 1001, which may perform various appropriate actions and processes according to a program stored in a read-only memory (ROM) 1002 or a program loaded from a storage portion 1008 into a random access memory (RAM) 1003. Various programs and data required for the operation of the system 1000 are also stored in the RAM 1003. The CPU 1001, the ROM 1002 and the RAM 1003 are connected to each other through a bus 1004. An input/output (I/O) interface 1005 is also connected to the bus 1004.

The following components are connected to the I/O interface 1005: an input portion 1006 including a keyboard, a mouse and so on; an output portion 1007 including a cathode ray tube (CRT), a liquid crystal display (LCD) and so on, and a speaker and so on; a storage portion 1008 including a hard disk and so on; and a communication portion 1009 including a network interface card such as a LAN card, a modem and so on. The communication portion 1009 performs communication processing via a network such as the Internet. A drive 1010 is also connected to the I/O interface 1005 according to requirements. A removable medium 1011, such as a magnetic disk, an optical disk, a magneto-optical disk, a semiconductor memory and so on, is installed on the drive 1010 according to requirements so that a computer program read therefrom is installed in the storage portion 1008 according to requirements.

In particular, according to the embodiment disclosed in the disclosure, the process described above with reference to the flowchart may be implemented as a computer software program. For example, the embodiment disclosed in the disclosure includes a computer program product, which includes a computer program carried on a computer-readable medium, the computer program containing a program code for performing the method shown in the flowchart. In such embodiment, the computer program may be downloaded and installed from the network through the communication portion 1009, and/or installed from the removable medium 1011. When the computer program is executed by the central processing unit (CPU) 1001, the above functions defined in the system according to the disclosure are executed.

It shall be noted that the computer-readable medium shown in the disclosure may be a computer-readable signal medium or a computer-readable storage medium or any combination of the above two media. The computer-readable storage medium may be, for example, but not limited to, an electronic, magnetic, optical, electromagnetic, infrared, or semiconductor system, apparatus or device, or any combination thereof.

More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program for use by or in connection with the instruction execution system, apparatus or device. The program code contained on the computer-readable medium may be transmitted using any appropriate medium, including but not limited to wireless, wire, optical cable, RF and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the disclosure may be implemented by software or hardware. The described modules may be also provided in a processor. For example, a description may be made as follows: a processor comprises a travelable region view determining module, a scene data acquiring module and a decision determining module. The names of these modules do not form limitations of the modules themselves in some cases. For example, the travelable region view determining module may be also described as "a module that determines a travelable region view according to current location information based on a constructed topological map".

As another aspect, the disclosure also provides a computer-readable medium, which may be included in the devices described in the above embodiment, or may exist independently without being assembled into the devices. The above computer-readable medium carries one or more programs, and the one or more programs, when executed by one of the devices, cause the device to include: determining a travelable region view according to current location information based on a constructed topological map; acquiring scene data, the scene data at least including a scene image, a scene depth map, and a scene analysis map; and determining an action decision based on the travelable region view, the scene data, and a navigation model.

In the embodiment of the disclosure, a smart navigation method by street views under a topological map based on deep reinforcement learning is proposed. First, before a vehicle travels, route planning is completed according to a topological map and a travelable route can be acquired. In the traveling process of the vehicle, based on the topological map and the determined travelable route, the vehicle can be roughly located and the travelable region can be acquired according to a GPS signal, and then local precise navigation is performed by a deep neural network. As compared with a map-free mode, the embodiment of the disclosure can improve the accuracy of real-time navigation under constraint of GPS, and thanks to multiple indices of a navigation model, the embodiment of the disclosure does not entirely rely on GPS, and thus can improve robustness of navigation.

In the local precise navigation, the embodiment of the disclosure proposes a new deep neural network to control the vehicle decision, and improve functions from three aspects, that is, action, state, and reward. The action is the travel speed, the deflection angular speed, the travel direction and the deflection direction in a discrete space, which more realistically simulates the decision control of the vehicle. State data sources include the scene video image, the scene analysis map, the scene depth map, the laser point cloud data, and the travelable region view, and scene adaptability of a navigation engine can be improved by means of multiple data sources. Action rewards are defined under the constraint of multiple indices, including the travel time, the travel distance, the traffic violation, the phased compliance, and so on, and adaptive navigation under different indices is achieved by weighting rewards. In summary, the embodiment of the disclosure improves the robustness with less cost, and the proposed deep neural network and decision are also closer to real driving.

The above specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement and so on made within the spirit and principle of the disclosure shall be included in the scope of protection of the disclosure.

The invention claimed is:

1. A smart navigation method based on a topological map, characterized by comprising:
   determining a travelable region view according to current location information for a present moment based on the topological map;

acquiring scene data, the scene data at least including a scene image, a scene depth map, and a scene analysis map for the present moment; and determining an action decision based on the travelable region view, the scene data, and a navigation model, the step of determining an action decision comprising:

performing a feature extraction on sample data including the region view and the scene data by an image classification convolutional network, importing the extracted feature, a target location, and a previous moment reward being a reward obtained for an action at a moment before the present moment into a first layer of a recurrent neural network, importing an output of the first layer of a recurrent neural network and a previous moment action being an action at a moment before the present moment into a second layer of recurrent neural network, and predicting the action decision by a fully connected network based on an output of the second layer of recurrent neural network.

2. The method as to claim 1, characterized in that the step of determining a travelable region view according to current location information for a present moment based on the topological map comprises:

performing a width expansion with traveling track points as the center in the topological map according to a preset width expansion rule to obtain a travelable region;

determining a range image in the topological map according to the current location information; and marking the travelable region in the range image to obtain the travelable region view.

3. The method as to claim 1, characterized in that the step of acquiring scene data comprises:

collecting the scene image by a vehicle-mounted camera in real time;

analyzing a scene depth of the scene image to obtain the scene depth map; and performing a semantic analysis on the scene image to obtain the scene analysis map.

4. The method as to claim 3, characterized in that the scene data further includes laser point cloud data; and the step of acquiring scene data further comprises: collecting lidar points by a vehicle-mounted lidar in real time; and normalizing the lidar points to obtain the laser point cloud data.

5. The method as to claim 1, characterized in that the navigation model is obtained by training based on deep reinforcement learning.

6. The method as to claim 5, characterized in that the action decision at least includes: a travel speed, a deflection angular speed, a travel direction and a deflection direction; and the step of predicting the action decision by a fully connected network comprises: predicting the travel speed, the deflection angular speed, the travel direction and the deflection direction of the action decision respectively to obtain corresponding predicted probabilities; and determining a combination of actions with the highest predicted probabilities as the predicted action decision.

7. A smart navigation apparatus based on a topological map, characterized by comprising:

one or more processor, the one or more processor being configured to:

determining a travelable region view according to current location information for a present moment based on the topological map;

acquiring scene data, the scene data at least including a scene image, a scene depth map, and a scene analysis map for the present moment;

determining an action decision based on the travelable region view, the scene data, and a navigation model;

performing a feature extraction on sample data including the region view and the scene data by an image classification convolutional network;

importing the extracted feature, a target location, and a previous moment reward being a reward obtained for an action at a moment before the present moment into a first layer of a recurrent neural network;

importing an output of the first layer of a recurrent neural network and a previous moment action being an action at a moment before the present moment into a second layer of recurrent neural network; and predicting the action decision by a fully connected network based on an output of the second layer of recurrent neural network.

8. The apparatus as to claim 7, characterized in that the one or more processors further being configured to:

performing a width expansion with traveling track points as the center in the topological map according to a preset width expansion rule to obtain a travelable region; determining a range image in the topological map according to the current location information; and marking the travelable region in the range image to obtain the travelable region view.

9. The apparatus as to claim 7, characterized in that the one or more processors further being configured to:

collecting the scene image by a vehicle-mounted camera in real time; analyzing a scene depth of the scene image to obtain the scene depth map; and performing a semantic analysis on the scene image to obtain the scene analysis map.

10. The apparatus as to claim 9, characterized in that the one or more processors further being configured to:

collecting lidar points by a vehicle-mounted lidar in real time; and normalizing the lidar points to obtain laser point cloud data; and the scene data further includes the laser point cloud data.

11. The apparatus as to claim 7, characterized in that the navigation model is obtained by training based on deep reinforcement learning.

12. The apparatus as to claim 11, characterized in that the one or more processors further being configured to:

predicting a travel speed, a deflection angular speed, a travel direction and a deflection direction of the action decision respectively to obtain corresponding predicted probabilities; and determining a combination of actions with the highest predicted probabilities as the predicted action decision; and the action decision at least includes: the travel speed, the deflection angular speed, the travel direction and the deflection direction.

13. A non-transitory computer-readable medium storing a processor-executable instructions, wherein when the processor-executable instructions are executed by a processor cause the processor to:

determining a travelable region view according to current location information for a present moment based on a constructed topological map;

acquiring scene data, the scene data at least including a scene image, a scene depth map, and a scene analysis map for the present moment;

determining an action decision based on the travelable region view, the scene data, and a navigation model;

performing a feature extraction on sample data including the region view and the scene data by an image classification convolutional network;

importing the extracted feature, a target location, and a previous moment reward being a reward obtained for an action at a moment before the present moment into a first layer of a recurrent neural network;

importing an output of the first layer of a recurrent neural network and a previous moment action being an action at a moment before the present moment into a second layer of recurrent neural network; and predicting the action decision by a fully connected network based on an output of the second layer of recurrent neural network.

* * * * *